United States Patent
Ju et al.

(10) Patent No.: US 6,430,015 B2
(45) Date of Patent: Aug. 6, 2002

(54) METHOD OF FABRICATION OF STRIPED MAGNETORESISTIVE (SMR) AND DUAL STRIPE MAGNETORESISTIVE (DSMR) HEADS WITH ANTI-PARALLEL EXCHANGE CONFIGURATION

(75) Inventors: Kochan Ju, Fremont; Mao-Min Chen; Cheng T. Horng, both of San Jose; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/773,743

(22) Filed: Feb. 2, 2001

Related U.S. Application Data

(62) Division of application No. 09/408,491, filed on Sep. 30, 1999, now Pat. No. 6,204,071.

(51) Int. Cl.[7] ................................. G11B 5/39
(52) U.S. Cl. ................................. 360/327.32
(58) Field of Search .................. 360/327.32

(56) References Cited

U.S. PATENT DOCUMENTS

| | | | |
|---|---|---|---|
| 5,408,377 A | 4/1995 | Gurney et al. | 360/113 |
| 5,644,456 A | 7/1997 | Smith et al. | 360/113 |
| 5,684,658 A | 11/1997 | Shi et al. | 360/113 |
| 5,731,936 A | 3/1998 | Lee et al. | 360/113 |
| 5,766,780 A | 6/1998 | Huang et al. | 428/692 |
| 5,768,067 A * | 6/1998 | Saito | 360/327.32 |
| 5,783,460 A | 7/1998 | Han et al. | 438/3 |

OTHER PUBLICATIONS

Parkin, "Systematic Variation of the Strength and Oscillation Period of Indirect Magnetic Exchange Coupling Through the 3d, 4d, and 5d Transition Metals," Physical Review Letters, vol. 67, No. 25, (1991), pp. 3598–3601.

* cited by examiner

Primary Examiner—A. J. Heinz
(74) Attorney, Agent, or Firm—George O. Saile; Stephen B. Ackerman; Graham S. Jones, II

(57) ABSTRACT

A longitudinally magnetically biased dual stripe magnetoresistive (DSMR) sensor element comprises a first patterned magnetoresistive (MR) layer. There are contacts at the opposite ends of the patterned magnetoresistive (MR) layer with a first pair of stacks defining a track width of the first magnetoresistive (MR) layer with a first pair of stacks defining a track width of the first magnetoresistive (MR) layer, each of the stacks including a first Anti-Ferro-Magnetic (AFM) layer and a first lead layer. With the first MR layer in place the device was annealed in the presence of a longitudinal external magnetic field. A second patterned magnetoresistive (MR) layer was formed above the previous structure. There are contacts at the opposite ends of the second patterned magnetoresistive (MR) layer with a second pair of stacks defining a second track width of the second patterned magnetoresistive (MR) layer. Each of the second pair of stacks includes spacer layer is composed of a metal, a Ferro-Magnetic (FM) layer, a second Anti-Ferro-Magnetic (AFM) layer and a second lead layer. With the second MR layer in place, the device was annealed in the presence of a second longitudinal external magnetic field.

20 Claims, 3 Drawing Sheets

METHOD OF FABRICATION OF STRIPED MAGNETORESISTIVE (SMR) AND DUAL STRIPE MAGNETORESISTIVE (DSMR) HEADS WITH ANTI-PARALLEL EXCHANGE CONFIGURATION

This is a division of patent application Ser. No. 09/408,491, filing date Sep. 30, 1999, now U.S. Pat. No. 6,204,071, Method of Fabrication of Striped Magnetoresistive (Smr) And Dual Stripe Magnetoresistive (Dsmr) Heads With Anti-Parallel Exchange Configuration, assigned to the same assignee as the present invention.

BACKGROUND OF THE INVENTION

1. Field of the Invention

This invention relates to Striped Magnetoresistive (SMR) heads and Dual Stripe Magnetoresistive (DSMR) heads and more particularly to methods of manufacturing of exchange biasing configurations therefor, as well as devices manufactured by such methods.

2. Description of Related Art

As the continuous trend in magnetic recording requires increased areal density, track widths of magnetic recording heads are being reduced. Commonly assigned U.S. patent application Ser. No. 09/182,775, filed Oct. 30, 1998 of Yimin Guo et al. for "Anti-Parallel Longitudinal Patterned Exchange Biased Dual Stripe Magnetoresistive (DSMR) Sensor Element and Method for Fabrication Thereof" describes a narrow track width DSMR head with dual sensors. The head, which increases signal amplitude is stabilized by anti-parallel biasing, i.e. with biasing which is parallel, but in the opposite directed or oriented. In such a biasing scheme, the magnetic centers of dual sensors self-align each other.

Accordingly, no track-offsetting is needed as disclosed in commonly assigned U.S. Pat. No. 5,783,460 of Han et al. for "Method of Making Self-Aligned Dual Stripe MagnetoResistive (DSMR) Head for High Density Recording" which shows a DSMR process using a lift off stencil to form a patterned dielectric layer edge. To achieve this quiescent biasing scheme, one can produce both sensors with Anti-Parallel EXchange-biasing (APEX) by means of exchange coupling between Anti-Ferro-Magnetic (AFM) and Ferro-Magnetic (FM) material.

U.S. Pat. No. 5,408,377 of Gurney et al. for "Magnetoresistive Sensor with Ferromagnetic Sensing Layer" shows a Ruthenium (Ru) AFM coupling film in a spin valve sensor.

U.S. Pat. No. 5,644,456 of Smith et al. for "Magnetically Capped Dual Magnetoresistive Reproduce Head" shows a cap layer in a DSMR that breaks exchange coupling between the magnetically permeable layer and MR elements.

U.S. Pat. No. 5,684,658 of Shi et al. for "High Track Density Dual Stripe Magnetoresistive (DMSR) Head" shows a DSMR having first and second anti-Ferro-Magnetic longitudinal biasing layers.

U.S. Pat. No. 5,731,936 of Lee et al. for "Magnetoresistive (MR) Sensor with Coefficient Enhancing that Promotes Thermal Stability" provides chromium based spacer layers for an MR layer of NiCr or NiFeCr compositions in place of Ta spacers to avoid a reported problem of degrading the magnetic moment of the MR stripe when high heat at the interface between the Ta spacer layer and the Permalloy (MR stripe) causing interdiffusion therebetween.

See Parkin, "Systematic Variation of the Strength and Oscillation Period of Indirect Magnetic Exchange Coupling through the 3d. 4d and 5d Transition Metals", Physical Review Letters Vol. 67, No. 25, pp. 3598–3601 (Dec. 16, 1991)

U.S. Pat. No. 5,766,780 of Huang et al. for "Reversed Order NiMn Exchange Biasing for Dual Magnetoresistive Heads" teaches a DSMR with a Mo layer as the conductor/seed layer on an alumina base coat. A NiMn exchange bias layer is formed on the Mo layer. A NiFe MR sensor layer is formed on the surface of the NiMn exchange bias layer.

SUMMARY OF THE INVENTION

This invention teaches a Ruthenium/Ferro-Magnetic/AFM three layer structure to replace an AFM in a sensor in an MR or DSMR. In the case of a DSMR, when one magnetically aligns both AFM in the same direction, the biasing direction of the MR sensor under the ruthenium will be anti-parallel to the other one. A key element of the invention is the Ru spacer that shows increased coupling strength.

In accordance with this invention a method is provided for forming a longitudinally magnetically biased dual stripe magnetoresistive (DSMR) sensor element comprises forming a first patterned magnetoresistive (MR) layer. Contact the opposite ends of the patterned magnetoresistive (MR) layer with a first pair of stacks defining a track width of the first magnetoresistive (MR) layer, each of the stacks including a first Anti-Ferro-Magnetic (AFM) layer and a first lead layer. Then anneal the device in the presence of a longitudinal external magnetic field. Next, form a second patterned magnetoresistive (MR) layer above the previous structure. Contact the opposite ends of the second patterned magnetoresistive (MR) layer with a second pair of stacks defining a second track width of the second patterned magnetoresistive (MR) layer. Each of the second pair of stacks includes spacer layer composed of a metal, a Ferro-Magnetic (FM) layer, a second Anti-Ferro-Magnetic (AFM) layer and a second lead layer. Then anneal the device in the presence of a second longitudinal external magnetic field.

In accordance with another aspect of this invention, a longitudinally magnetically biased dual stripe magnetoresistive (DSMR) sensor element is provided including a first patterned magnetoresistive (MR) layer. There are a pair of opposite ends of the first patterned MR layer being in contact with a first pair of stacks defining a first track width of the patterned MR layer. Each of the stacks includes a first AFM layer and a first lead layer. The device has a first longitudinal magnetic field bias in the first AFM layer. There is a second patterned MR layer contacted at its opposite ends by a second pair of stacks defining a second track width of the second patterned MR layer. Each of the second pair of stacks includes a spacer layer composed of a metal, a Ferro-Magnetic (FM) layer, a second AFM layer and a second lead layer. The device has a second longitudinal magnetic field bias in the second AFM layer. Preferably, the spacer layer is composed of a metal selected from the group consisting of ruthenium (Ru), rhodium (Rh), copper (Cu) and chromium (Cr). It is also preferred that the Ferro-Magnetic layers are composed of a metal selected from the group consisting of NiFe, Co, Fe, NiCo and CoFe. Moreover, it is preferred that the AFM layers are composed of a metal selected from the group consisting of IrMn, NiMn, PtMn, PdPtMn and FeMn.

BRIEF DESCRIPTION OF THE DRAWINGS

The foregoing and other aspects and advantages of this invention are explained and described below with reference to the accompanying drawings, in which:

FIG. 2A shows a device in an early stage of being manufactured in accordance with this invention. FIG. 2B shows the device of FIG. 2A after having been annealed in the presence of an externally applied magnetic field shown in phantom (since it is no longer present) which has produced a longitudinal biasing magnetic field from left to right producing a magnetic field from right to left in a magnetoresistive sensor. FIG. 2C shows the device of FIG. 2B after formation of the remaining layers of the DSMR but prior to annealing of the AFM layers thereof. First an intermediate dielectric layer ISD is formed composed of a non-magnetic dielectric material, e.g. alumina ($Al_2O_3$), silicon. FIG. 2D shows the device of FIG. 2C after having been annealed in the presence of an externally applied magnetic field H2 shown in phantom (since it is no loner present) which has produced a longitudinal biasing field from left to right in the Ferro-Magnetic layers FLU and FRU in the same direction producing a magnetic field from right to left with reversely directed, pinned magnetic fields from right to left in the sensor MR2 and from right to left in the sensor MR1.

DESCRIPTION OF THE PREFERRED EMBODIMENT

In accordance with this invention, to fabricate an Anti-Parallel EXchange-biasing (APEX) head, two Anti-Ferro-Magnetic (AFM) layers with a distinct difference in blocking temperatures are selected. We find that by annealing at two different temperatures, one achieves an APEX state in a Dual Stripe Magneto-Resistive (DSMR) head. Another approach is to use the same AFM material in the biasing layers. The AFM layer of the first MR sensor is annealed in a desired first direction of magnetization. We also find that the AFM layer of the second MR sensor is consequently annealed in the opposite direction without degrading the exchange magnetic field magnitude and direction of first AFM layer of the first MR sensor.

We find, in addition, that APEX heads manufactured by these methods require a magnetic initialization process to set sensors back to APEX state. Further in accordance with this invention, the longitudinal switch threshold magnetic field for two MR sensors can be determined. Our specific recipe of longitudinal magnetic field provides a sequence for tailoring the exchange magnetic field, coercivity and annealing conditions.

In a GMR device, a strong interlayer coupling which is known as Anti-Parallel Ferro-Magnetic Interlayer (APFI) coupling, can be used in a sandwiched structure of Ferro-Magnetic/spacer/Ferro-Magnetic layers. When depositing an AFM layer onto such a sandwiched structure, a strong AFM layer magnetization pins the magnetization of its neighboring magnetic layer. The bottom Ferro-Magnetic layer is in an APFI coupling state.

Figure 1:
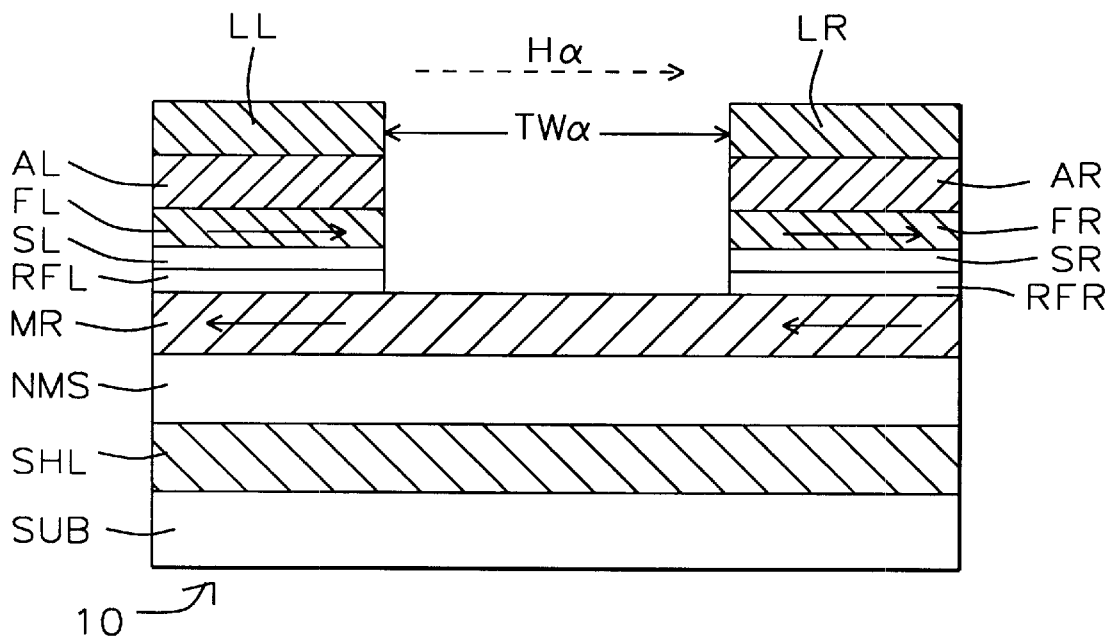
FIG. 1 illustrates an application of an exchange biasing structure of a Ferro-Magnetic/spacer/Ferro-Magnetic/Anti-Ferro-Magnetic (MR/SP/FM/AFM) for biasing a single MR sensor longitudinally in accordance with this invention.

In the embodiment of this invention shown in FIG. 1, net magnetic flux is determined from the difference of magnetic moment of bottom and top Ferro-Magnetic layers which comprise the magnetoresistive layer MR on the bottom and Ferro-Magnetic layers FL/FR on the top.

FIG. 1 illustrates an application of an exchange biasing structure of a Ferro-Magnetic/spacer/Ferro-Magnetic/Anti-Ferro-Magnetic (MR/SP/FM/AFM) for biasing a single MR sensor longitudinally in accordance with this invention. The device of FIG. 1 includes a substrate SUB upon which is formed a shield layer SHL upon which a first non-magnetic spacer layer NMS is formed. The magnetoresistive sensor MR is formed on the first non-magnetic spacer layer NMS. Refill layers RFL and RFR are formed on the surface of the left and right ends of magnetoresistive sensor MR and a set of second non-magnetic spacer layers SL and SR are formed on the surfaces of the refill layers RFL and RFR above the magnetoresistive sensor MR. Above the second non-magnetic spacer layers SL and SR are formed a set of Ferro-Magnetic layers FL and FR upon which are formed exchange biasing Anti-Ferro-Magnetic (AFM) layers AL and AR which overlie the ends of layers FL and FR. In turn leads LL, and LR have been formed over the AFM layers AL and AR respectively.

The exchange biasing AFM layers AL and AR are shown after annealing in the presence of an externally applied magnetic field Hα shown in phantom (since it is no longer present) which has produced a longitudinal biasing magnetic field from left to right in the Ferro-Magnetic layers FL and FR with reversely directed, pinned magnetic fields in the Ferro-Magnetic layers FL and FR above the ends of magnetoresistive sensor MR. The magnetic fields of the Ferro-Magnetic, magnetoresistive sensor layer MR causes a resultant matching and opposite, magnetic field from right to left in the magnetoresistive sensor MR.

In practice, the net magnetic flux of the structure is needed to stabilize and bias the magnetoresistive sensor MR. The net magnetic flux is determined from the difference of magnetic moment of bottom Ferro-Magnetic magnetoresistive sensor MR and the top Ferro-Magnetic layers FL and FR.

Figure 2A:
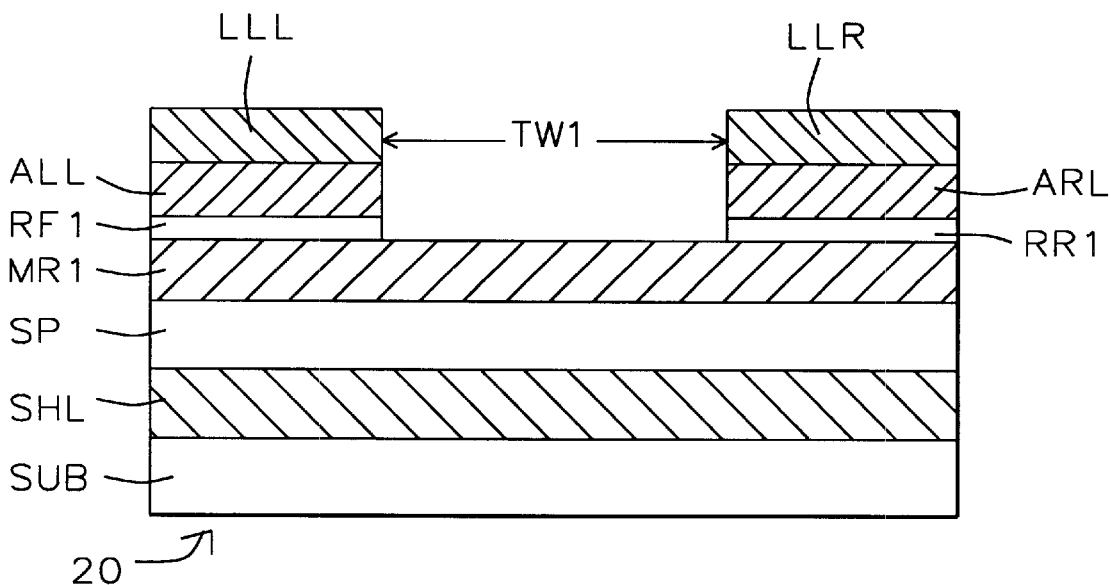
FIGS. 2A–2D show a method of employing the method of this invention in a Dual Stripe Magneto-Resistive (DSMR) head application, in which one can replace the bias structure of one of the sensors by the multi-layer structure of this invention as illustrated by FIG. 1.
Figure 2B:
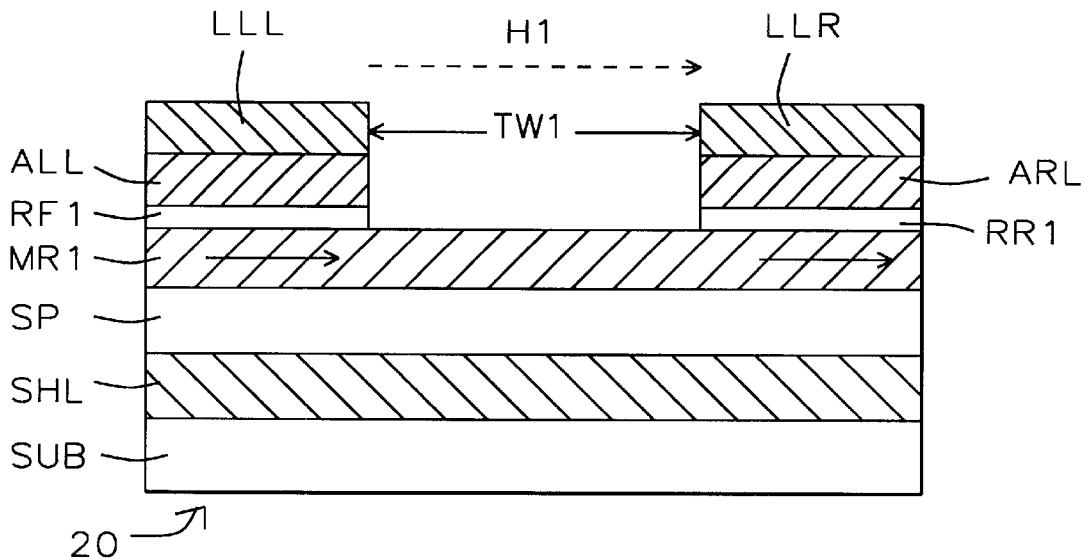
Figure 2C:
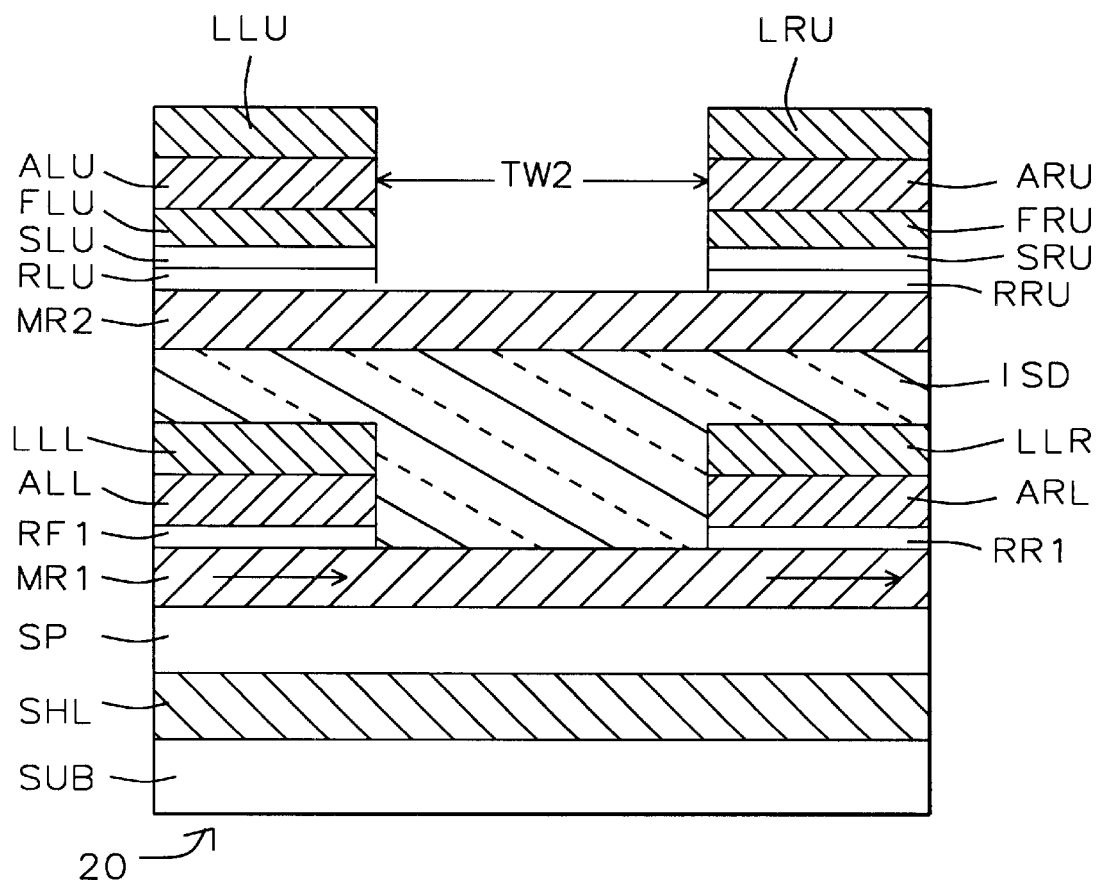
Figure 2D:
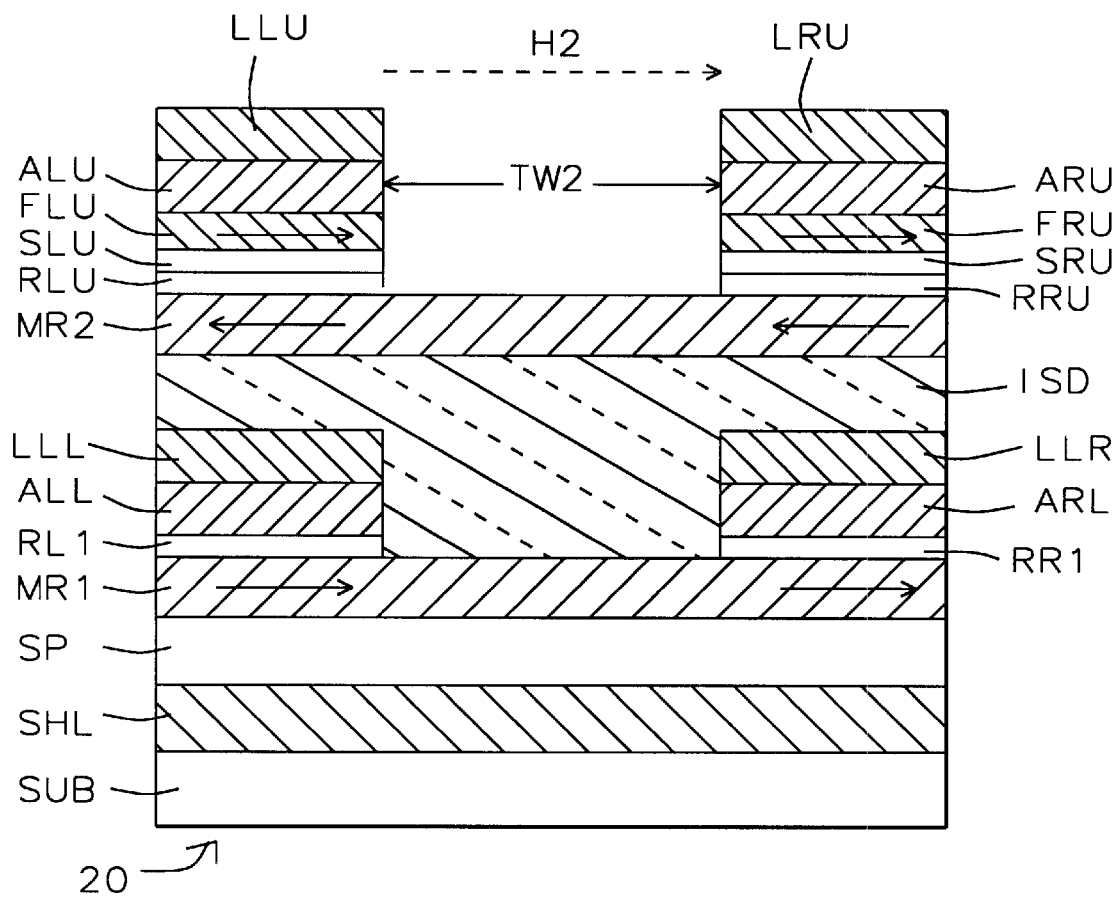

FIGS. 2A–2D show a method of employing the method of this invention in a Dual Stripe MR (DSMR) head application, in which one can replace the bias structure of one of sensors by the multi-layer structure of this invention as illustrated by FIG. 1. When we reset the bias direction, both sensors MR1 and MR2 will be automatically biased in anti-parallel directions as seen in FIG. 2D. This structure can also greatly simplify the annealing process and can also greatly simplify the initialization process.

The Anti-Parallel (AP) initialization becomes simple, since both Anti-Parallel Magnetizations (APM) are in a unique direction. After completing all the necessary thermal cycles for wafer fabrication, the wafer will be annealed in a high longitudinal magnetic field which is slightly larger than shield saturation (the value is depend on shield material and design). The sensor magnetization can be reset accordingly.

Process Steps

FIG. 2A shows a device 20 being manufactured in accordance with the method of this invention. A substrate SUB composed of a material such as a ceramic, e.g. alumina ($Al_2O_3$), titanium carbide (TiC), has been coated with a shield layer SHL preferably composed of a ferromagnetic material such as Permalloy (NiFe, 80:20). Upon the shield layer a spacer layer SP is formed composed of a non-magnetic material, e.g. alumina ($Al_2O_3$), silicon oxide ($SiO_2$) or silicon nitride ($Si_3N_4$). Upon the spacer layer SP a first magnetoresistive sensor layer MR1 is formed composed of a Ferro-Magnetic material such as Permalloy (NiFe, 80:20), Co, Fe, NiCo, or CoFe.

Next, on the left and right ends of the magnetoresistive sensor MR1 a pair of stacks are formed on the top surface of magnetoresistive sensor MR1 with a track width TW1 formed therebetween, conventional processing techniques such as a lift-off process.

In the stack on the left, there are three layers starting with the refill layer RF1 (RL1 in FIG. 2D) formed of NiFe/80:20 on the surface of magnetoresistive sensor MR1 followed by the left AFM layer ALL preferably formed of a material selected from the group consisting of IrMn, NiMn, PtMn, PdPtMn and FeMn. On top of the left AMF layer ALL is the left lead line LLL, preferably formed of copper.

In the stack on the right, there are three layers starting with the refill layer RR1 formed of NiFe/80:20 on the surface of the right end of the magnetoresistive sensor MR1 followed by the right AFM layer ARL preferably formed of a material selected from the group consisting of IrMn, NiMn, PtMn, PdPtMn and FeMn. On top of the right AMF layer ARL is the right lead line LLR, preferably formed of copper.

FIG. 2B shows the device of FIG. 2A after having been annealed in the presence of an externally applied magnetic field H1 shown in phantom (since it is no longer present) which has produced a longitudinal biasing magnetic field from left to right in AFM layers ALL and ARL producing a magnetic field from right to left in the sensor MR1.

FIG. 2C shows the device of FIG. 2B after formation of the remaining layers of the DSMR but prior to annealing of the AFM layers thereof. First an intermediate dielectric layer ISD is formed composed of a non-magnetic dielectric material, e.g. alumina ($Al_2O_3$), silicon oxide ($SiO_2$) or silicon nitride ($Si_3N_4$) and layer ISD was planarized.

Next, a second magnetoresistive sensor layer MR2 on planarized layer ISD is formed composed of a Ferro-Magnetic material such as Permalloy (NiFe, 80:20), Co, Fe, NiCo, or CoFe.

Next, on the left and right ends of the MR sensor MR2 an upper pair of stacks are formed on the top surface of Magneto-Resistive sensor MR2 with a track width TW2 formed therebetween, conventional processing techniques such as a lift-off process.

In the upper stack on the left, there are five layers starting with the upper left refill layer RLU formed of NiFe/80:20 on the surface of magnetoresistive sensor MR2, followed by the upper left spacer layer SLU formed preferably of ruthenium (Ru) or at least one of rhenium (Rh), copper (cu) or chromium (Cr). Above the upper left spacer SLU is formed the upper left Ferro-Magnetic layer FLU preferably composed of a Ferro-Magnetic material such as Permalloy (NiFe, 80:20), Co, Fe, NiCo, or CoFe.

Next follows the upper left AFM layer ALU preferably formed of a material selected from the group consisting of IrMn, NiMn, PtMn, PdPtMn and FeMn. On top of the upper left AMF layer ALU is the upper left lead line LLU, preferably formed of gold.

In the upper stack on the right, there are five layers starting with the upper right refill layer RRU formed of NiFe on the surface of the right end of the magnetoresistive sensor MR2, followed by the upper right spacer layer SRU formed preferably of ruthenium (Ru) or at least one of rhodium (Rh), copper (Cu) or chromium (Cr).

Next follows upper right Ferro-Magnetic layer FRU preferably composed of a Ferro-Magnetic material such as Permalloy (NiFe, 80:20), Co, Fe, NiCo, or CoFe. Upon layer FRU is formed exchange biasing Anti-Ferro-Magnetic (AFM) layers ARU, preferably formed of a material selected from the group consisting consisting of IrMn, NiMn, PtMn, PdPtMn and FeMn. On top of the right AMF layer ARU is the right lead line LLR, preferably formed of gold.

FIG. 2D shows the device of FIG. 2C after having been annealed in the presence of an externally applied magnetic field H2 shown in phantom (since it is no longer present) which has produced a longitudinal biasing magnetic field from left to right in the Ferro-Magnetic layer FLU and FRU in the same direction producing a magnetic field from right to left with reversely directed, pinned magnetic fields from right to left in the sensor MR2 and from right to left in the sensor MR1.

SUMMARY

In the sandwiched structure, there are coupling forces between the magnetic layers that try to align their magnetization directions to be either parallel (P) or anti-parallel (AP). With increasing thicknesses of the spacers SL and SR, the P and AP will be alternated. The most pronounced coupling effect is observed when Ru was used as the spacer layer SL and SR. In this case, the coupling strength can reach a level ten (10) times stronger than that provided by a copper (Cu) spacer or other noble metals. The Ru layer thickness can be selected so that the bottom layer will be in an APF1 (Anti-Parallel Ferro-Magnetic Interlayer) coupling state.

For a DSMR head dual MR layer structure, fabrication of the AFM layer in one of the two MR sensors is replaced by Ru/Ferro-Magnetic/AFM three layers. When we magnetically align two AFM layers in the same direction, the biasing direction of the sensor under the Ru layer will be automatically anti-parallel to that the other one. Substitution for the Ru layer can be made by metals selected from Rh, Cu and Ir. The Ferro-Magnetic film can be made of a material selected from a metal such as Co or Fe or alloys such as NiFe, NiCo and CoFe. The AFM layer can be composed of an alloy such as IrMn, NiMn, PtMn, PdPtMn and FeMn, etc.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly, all such changes come within the purview of the present invention and the invention encompasses the subject matter of the claims which follow.

Having thus described the invention, what is claimed as new and desirable to be secured by Letters Patent is as follows:

1. A device for a longitudinally magnetically biased dual stripe magnetoresistive (DSMR) sensor element comprising:
   a first patterned magnetoresistive (MR) layer;
   a pair of opposite ends of said first patterned MR layer being in contact with a first pair of stacks defining a first track width of said patterned MR layer.
   each of said stacks including as follows:
      a first Anti-Ferro-Magnetic (AFM) layer and
      a first lead layer, and
      said device having a first longitudinal magnetic field bias in said first AFM layer,
   a second patterned MR layer,
      a pair of opposite ends of said second patterned MR layer in contact with a second pair of stacks defining a second track width of said second patterned MR layer, each of said second pair of stacks including as follows:
a spacer layer composed of a metal,
a Ferro-Magnetic (FM) layer,
a second AFM layer and
a second lead layer, and
said device having a second longitudinal magnetic field bias in said second AFM layer.

2. A device in accordance with claim 1 wherein said spacer layer is composed of a metal selected from the group consisting of ruthenium (Ru), rhodium (Rh), copper (Cu) and chromium (Cr).

3. A device in accordance with claim 1 wherein said Ferro-Magnetic layers are composed of a metal selected from the group consisting of NiFe, Co, Fe, NiCo and CoFe.

4. A device in accordance with claim 1 wherein said AFM layers are composed of a metal selected from the group consisting of IrMn, NiMn, PtMn, PdPtMn and FeMn.

5. A device in accordance with claim 1 wherein:
said spacer layer is composed of a metal selected from the group consisting of ruthenium (Ru), rhodium (Rh), copper (Cu) and chromium (Cr), and
said Ferro-Magnetic layers are composed of a metal selected from the group consisting of NiFe, Co, Fe, NiCo and CoFe.

6. A device in accordance with claim 1 wherein:
said spacer layer is composed of a metal selected from the group consisting of ruthenium (Ru), rhodium (Rh), copper (Cu) and chromium (Cr),
said Ferro-Magnetic layers are composed of a metal selected from the group consisting of NiFe, Co, Fe, NiCo and CoFe, and
said AFM layers are composed of a metal selected from the group consisting of IrMn, NiMn, PtMn, PdPtMn and FeMn.

7. A longitudinally magnetically biased stripe magnetoresistive sensor element comprising:
a shield layer on a substrate,
a first nonmagnetic spacer layer on the shield layer,
a first patterned magnetoresistive (MR) layer on the first nonmagnetic spacer layer,
a pair of opposite ends of the patterned magnetoresistive (MR) layer contacting a pair of stacks defining a track width of the patterned magnetoresistive (MR) layer,
each of the stacks including as follows:
a refill layer formed on the surface of the first patterned MR layer,
a second nonmagnetic spacer layer (SL/SR) composed of a metal formed directly on the surface of the refill layer,
a Ferro-Magnetic (FM) layer (FL/FR) formed directly on the second nonmagnetic spacer layer,
an Anti-Ferromagnetic (AFM) layer (AL/AR) formed directly on the Ferro-Magnetic (FM) layer,
a lead layer, and
the element having a longitudinal magnetic bias.

8. The element of claim 7 wherein the second nonmagnetic spacer layer is composed of a metal selected from the group consisting of ruthenium (Ru), rhodium (Rh), copper (Cu) and chromium (Cr).

9. The element of claim 7 wherein the Ferro-Magnetic layer is composed of a metal selected from the group consisting of NiFe, Co, Fe, NiCo and CoFe.

10. The element of claim 7 wherein the AFM layer is composed of a metal selected from the group consisting of IrMn, NiMn, PtMn, PdPtMn and FeMn.

11. The element of claim 7 wherein:
the second nonmagnetic spacer layer is composed of a metal selected from the group consisting of ruthenium (Ru), rhodium (Rh), copper (Cu) and chromium (Cr), and
the Ferro-Magnetic layer is composed of a metal selected from the group consisting of NiFe, Co, Fe, NiCo and CoFe.

12. The element of claim 7 wherein:
the second nonmagnetic spacer layer is composed of a metal selected from the group consisting of ruthenium (Ru) rhodium (Rh), copper (Cu) and chromium (Cr),
the Ferro-Magnetic layer is composed of a metal selected from the group consisting of NiFe, Co, Fe, NiCo and CoFe, and
the AFM layer is composed of a metal selected from the group consisting of IrMn, NiMn, PtMn, PdPtMn and FeMn.

13. A longitudinally magnetically biased dual stripe magnetoresistive (DSMR) sensor element comprising:
a first patterned magnetoresistive (MR) layer,
a pair of opposite ends of the patterned magnetoresistive (MR) layer contacting a first pair of stacks defining a track width of the patterned magnetoresistive (MR) layer leaving an exposed surface of the first patterned MR layer,
each of the stacks including as follows:
a refill layer formed on the surface of the first patterned MR layer,
a first Anti-Ferro-Magnetic (AFM) layer formed on the surface of the refill layer, and a
first lead layer formed on the surface of the surface of the AFM layer,
the device having an intermediate bias,
a planarized intermediate dielectric layer on the surface of the first lead layer and on the exposed surface of the first patterned MR layer,
a second patterned MR layer,
a pair of opposite ends of the second patterned MR layer contacting a second pair of stacks defining a second track width of the second patterned MR layer leaving an exposed surface of the second patterned MR layer,
each of the second pair of stacks including as follows:
a second refill layer formed on the surface of the second patterned MR layer,
a spacer layer composed of a metal formed on the surface of the second refill layer,
a Ferro-Magnetic (FM) layer formed on the surface of the surface layer,
a second Anti-Ferro-Magnetic (AFM) layer and a second lead layer, and
the element having a longitudinal magnetic bias.

14. The element of claim 13 wherein the spacer layer is composed of a metal selected from the group consisting of ruthenium (Ru), rhodium (Rh), copper (Cu) and chromium (Cr).

15. The element of claim 13 wherein the Ferro-Magnetic layers are composed of a metal selected from the group consisting of NiFe, Co, Fe, NiCo and CoFe.

16. The element of claim 13 wherein the AFM layers are composed of a metal selected from the group consisting of IrMn, NiMn, PtMn, PdPtMn and FeMn.

17. The element of claim 13 wherein:
the spacer layer is composed of a metal selected from the group consisting of ruthenium (Ru), rhodium (Rh), copper (Cu) and chromium (Cr), and the Ferro-Magnetic layers are composed of a metal selected from the group consisting of NiFe, Co, Fe, NiCo and CoFe.

18. The element of claim 13 wherein:

the spacer layer is composed of a metal selected from the group consisting of ruthenium (Ru), rhodium (Rh), copper (Cu) and chromium (Cr), the Ferro-Magnetic layers are composed of a metal selected from the group consisting of NiFe, Co, Fe, NiCo and CoFe, and the AFM layers are composed of a metal selected from the group consisting of IrMn, NiMn, PtMn, PdPtMn and FeMn.

19. A longitudinally magnetically biased stripe magnetoresistive sensor element comprising:

a shield layer composed of Permalloy (NiFe) on a substrate composed of a material selected from a the group consisting of a ceramic, alumina, and titanium carbide, a first nonmagnetic spacer layer on the shield layer, composed of a material selected from a the group consisting of alumina, silicon oxide and titanium carbide, a first patterned magnetoresistive (MR) layer on the first nonmagnetic spacer layer, a pair of opposite ends of the patterned magnetoresistive (MR) layer contacting a pair of stacks defining a track width of the patterned magnetoresistive (MR) layer composed on NiFe, each of the stacks including as follows:
 a second patterned magnetoresistive (MR) refill layer composed of NiFe formed on the surface of the first patterned MR layer,
 a second nonmagnetic spacer layer (SL/SR) composed of a metal formed directly on the surface of the second patterned MR refill layer composed of a metal selected from the group consisting of ruthenium (Ru), rhodium (Rh), copper (Cu) and chromium (Cr),
 a Ferro-Magnetic (FM) layer (FL/FR) composed of a metal selected from the group consisting of NiFe, Co, Fe, NiCo and CoFe formed directly on of the second nonmagnetic spacer layer,
 an Anti-Ferro-Magnetic (AFM) layer (AL/AR) composed of a metal selected from the group consisting of IrMn, NiMn, PtMn, PdPtMn, and FeMn formed directly on of the Ferro-Magnetic (FM) layer, and
 a lead layer, and
 the element having a longitudinal magnetic bias.

20. A longitudinal magnetically biased dual stripe magnetoresistive (DSMR) sensor element comprising:

a shield layer composed of PERMALLOY (NiFe) on a substrate composed of a material selected from a the group of a ceramic, alumina, and titanium carbide, a first nonmagnetic spacer layer on the shield layer, composed of a material selected from a the group consisting of alumina, silicon oxide and titanium carbide, a first patterned magnetoresistive (MR) layer, a pair of opposite ends of the patterned MR layer contacting a first pair of stacks defining a track width of the patterned MR layer leaving an exposed surface of the first patterned MR layer, each of the stacks including as follows:
 a refill layer formed on the surface of the first patterned MR layer,
 a first Anti-Ferro-Magnetic (AFM) layer formed on the surface of the refill layer, and a first lead layer formed on the surface of the AFM layer, and first lead layer formed on the surface of the AFM layer, and a planarized intermediate dielectric layer on the surface of the first lead layer and on the exposed surface of the first patterned MR layer, a second patterned MR layer, contacting a pair of opposite ends of the second patterned MR layer with a second pair of stacks defining a second track width of the second patterned MR layer leaving an exposed surface of the second patterned MR layer, each of the second pair of stacks including as follows:
 a second refill layer formed on the surface of the second patterned MR layer,
 a spacer layer composed of a metal formed on the surface of the second refill layer, the spacer layer being composed of a metal selected from the group consisting of ruthenium (Ru), rhodium (Rh), copper (Cu) and chromium (Cr), a Ferro-Magnetic (FM) layer formed on the surface of the spacer layer, the Ferro-Magnetic layers being composed of a metal selected from the group consisting of NiFe, Co, Fe NiCo and CoFe, a second Anti-Ferro-Magnetic (AFM) layer, the AFM layers being composed of a metal selected from the group consisting of IrMn, NiMn, PtMn, PtMn, PdPtMn and FeMn, and a second lead layer, and the device having longitudinal magnetic bias.

* * * * *